Feb. 6, 1962 P. W. SYLVESTER 3,020,084
PARTING SWIVEL JOINT
Filed July 30, 1959 2 Sheets-Sheet 1
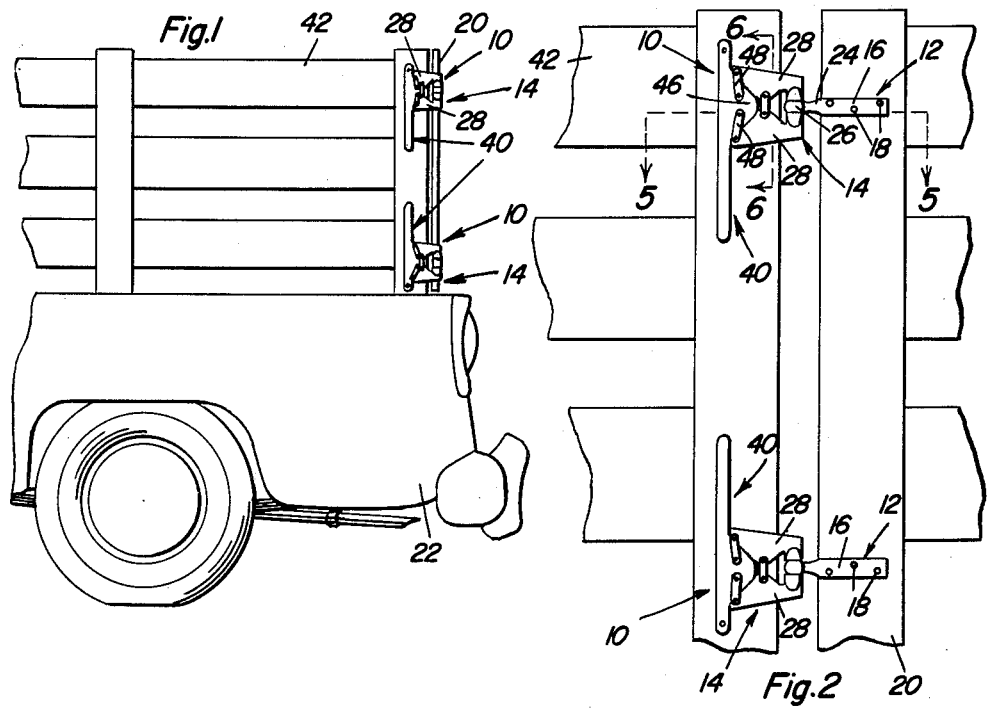
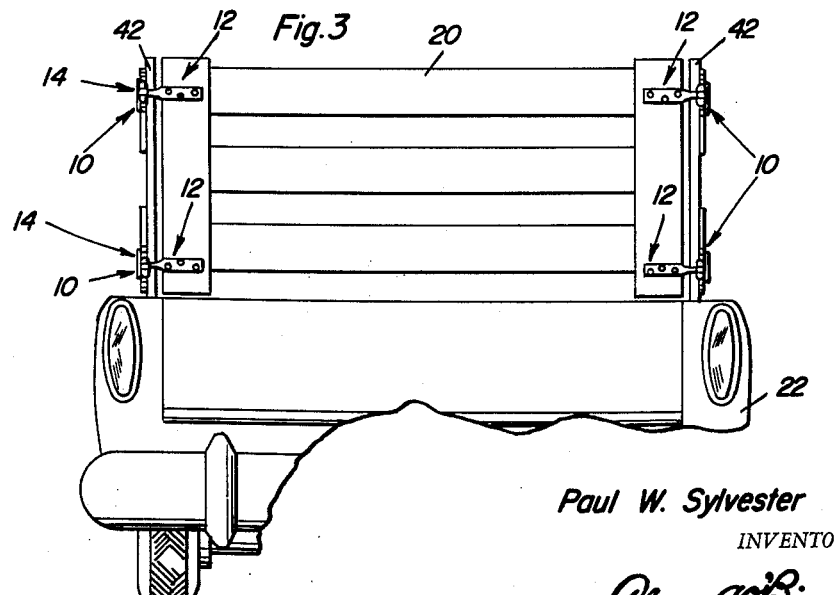
Paul W. Sylvester
INVENTOR.

Feb. 6, 1962  P. W. SYLVESTER  3,020,084
PARTING SWIVEL JOINT
Filed July 30, 1959  2 Sheets-Sheet 2
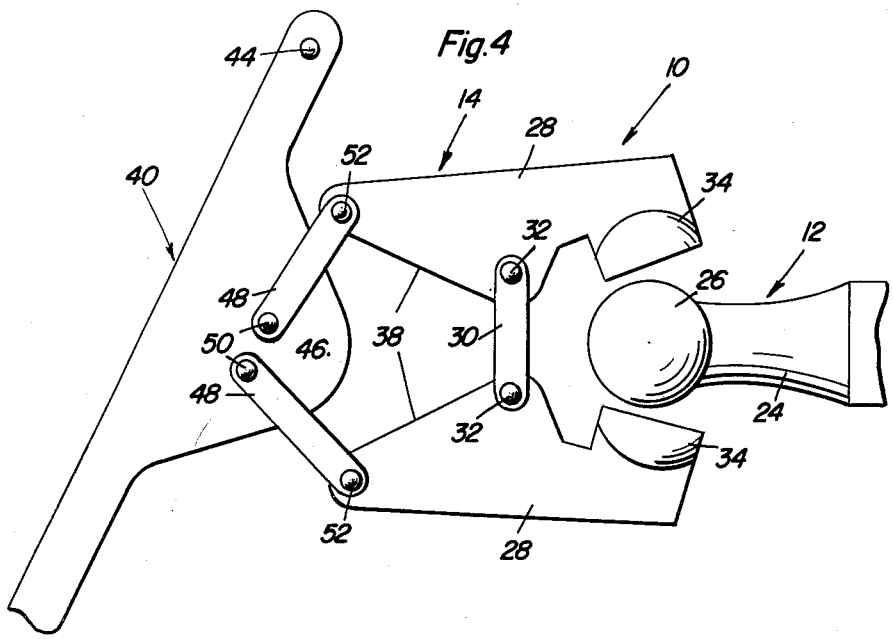
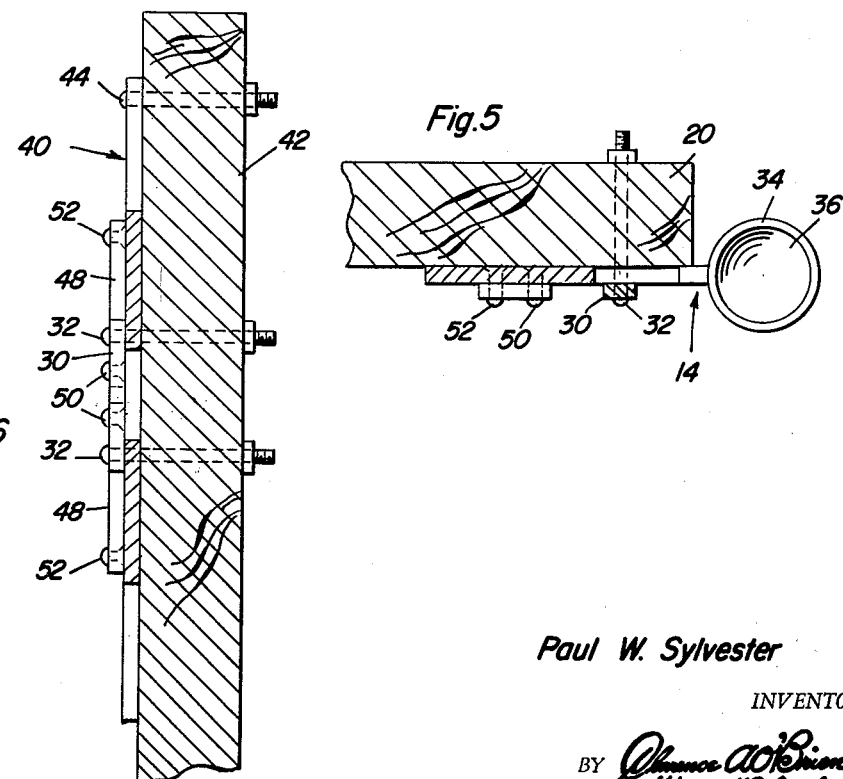
Paul W. Sylvester
INVENTOR.

United States Patent Office 3,020,084
Patented Feb. 6, 1962

3,020,084
PARTING SWIVEL JOINT
Paul W. Sylvester, Hotchkiss, Colo.
Filed July 30, 1959, Ser. No. 830,591
10 Claims. (Cl. 296—51)

This invention relates to a novel and useful parting swivel joint and more particularly to a parting swivel joint that is adapted to removably secure two articles together in such a manner whereby they may be rotated relative to each other about two perpendicular axes.

The parting swivel joint comprising the present invention is especially adapted to be utilized in securing the tailgate of a truck to an open ended body thereof. The invention provides a means whereby the tailgate of an open ended bodied truck may be pivoted towards and away from an open position about axes extending horizontally adjacent either the top or bottom of the tailgate or about axes extending vertically adjacent either side of the tailgate so as to enable the latter to be moved to an open position in the most advantageous manner.

Inasmuch as the invention utilizes swivel joints which may be easily parted, the invention also enables the tailgate to be readily removed or detached from the body of a truck.

The main object of this invention is to provide a parting swivel joint connection which may be utilized at each corner of a truck tailgate to enable the latter to be pivoted towards and from an open position about axes extending along either margin of the tailgate.

A further object of this invention, in accordance with the preceding object, is to provide a parting swivel joint connection for the tailgate of an open ended bodied truck which will enable the tailgate thereof to be readily removed therefrom.

Still another object of this invention, in accordance with the preceding objects, is to provide a means for yieldably retaining the swivel joint connection in a closed position.

Yet a further object of the invention is to provide a parting swivel joint connection which may be conveniently utilized to removably and swivelly secure a first element to a second element.

A final object to be specifically enumerated herein is to provide a parting swivel joint connection which will conform to conventional forms of manufacture, be of simple construction, and easy to operate so as to provide a device that will be economically feasible, long lasting, and operable by substantially everybody who would have a use for the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a pair of the parting swivel joints shown mounted upon the left side of a conventional truck body and the tailgate therefor;

FIGURE 2 is an enlarged side elevational view of the pair of parting swivel joints as seen in FIGURE 1 but with the tailgate of the truck shown in an open position, parts of the body and tailgate being broken away;

FIGURE 3 is an end elevational view of a truck body showing four of the parting swivel joints mounted upon the sides and the tailgate of the truck body;

FIGURE 4 is an enlarged side elevational view of the parting swivel joint shown in the open position, parts of the actuating lever and keeper being broken away;

FIGURE 5 is an enlarged horizontal sectional view taken substantially upon the plane indicated by the section line 5—5 of FIGURE 2;

FIGURE 6 is an enlarged vertical sectional view taken substantially upon the plane indicated by the section line 6—6 of FIGURE 2.

Referring now more specifically to the drawings, the numeral 10 generally designates the parting swivel joint comprising the instant invention which includes a latch generally referred to by the reference numeral 12 and an articulated keeper mechanism generally referred to by the reference numeral 14.

With attention now directed more particularly to FIGURES 2 through 5, it will be seen that the latch 12 comprises a body portion 16 which is suitably apertured for receiving fasteners 18 for securing the keeper 12 to the four corners of the tailgate 20 of a truck 22. The body portion 16 is provided with an integral neck portion 24 of reduced diameter which terminates in a spherical latch member 26.

The articulated keeper mechanism 14 comprises a pair of keeper jaws which are pivotally secured together by means of a connecting link 30. Each of the jaws 28 is suitably apertured to receive the pivot pins 32 which are passed through the opposite ends of the connecting link 30. It is to be understood that the pivot pins 32 may be secured through the keeper jaws 28 in any convenient manner. Each of the keeper jaws 28 is provided with an enlarged head portion 34 which has formed therein a semi-spherical recess 36.

The keeper jaws 28 are pivotally secured to each other intermediate their ends and the end portions remote from the head portions 34 are provided with inclined divergent opposing surfaces 38.

It is to be understood that the pivot pins 32 also serve to pivotally secure the keeper jaws 28 to the tailgate 20 of the truck 22. An actuating lever generally referred to by the reference numeral 40 is provided and has one end thereof pivotally secured to the body 42 of the truck 22 by means of pivot pin 44. The actuating lever 40 includes a projection 46 which is movable through an arc to seat in the pocket formed between the opposing inclined surfaces 38 when the keeper jaws are pivoted to the closed position.

A pair of actuating links 48 is provided for closing the keeper jaws 28 upon movement of the actuating lever 40 each having one end pivotally secured to the projection by means of pivot pins 50 and the other end pivotally secured to the end of one of the keeper jaws 28 remote from the head portions 34 by means of pivot pins 52.

In operation, with attention drawn more particularly to FIGURES 2 through 4, it will be noted that a latch 12 is secured to the four corners of the tailgate 20 with the neck portion 24 and the spherical latch member projecting beyond the side edges thereof, and that four articulated keeper mechanisms 14 are secured in pairs to the rear ends of the opposite sides 42 of the truck 22 with the head portions 34 projecting beyond the rear edges thereof. It may thus be seen that the tailgate 20 may be pivoted about horizontal axes extending adjacent the upper or lower edges of the tailgate 20 and also about axes extending vertically adjacent the side edges of the tailgate 20.

With attention now directed more particularly to FIGURE 2 of the drawings, it will be noted that the projection 46 is received within the pocket formed by the confronting divergent surfaces 38 of the keeper jaws 28 when the latter are in the closed position, and that the actuating links 48 are positioned in an overcenter position to yieldably retain the head portions 34 in embracing engagement with the latch member 26.

Thus it may be seen that herein described is a parting swivel joint which may be used in various combinations to removably and swivelly secure a tailgate to an open ended truck body for movement about horizontal axes extending adjacent either the top or lower edge of the tailgate and about axes extending vertically adjacent either of the side edges of the tailgate.

Further, it is to be noted that the swivel joint 10 may be used for other purposes other than to secure tailgates to truck bodies and that two of these purposes are to secure closure doors to truck van bodies and emergency doors to school buses, and the like. When the joint 10 is to be used to secure a door to an enclosure and the door must be operable from either side, the pivot pin 44 will be journaled through the wall of the enclosure and the actuating lever 40 will be fixedly secured to the outer end of the pivot 44 and a second actuating lever (not shown) fixedly secured to the inner end of pivot pin 44. The joint 10 may then be operated from the interior of the closure. Therefore, the parting swivel joint can easily be modified to be operable from both sides of a door.

With particular attention directed now to FIGURE 4 of the drawings, it will be seen that the connecting link 30 extends beyond the upper and lower surfaces of the latch member 26 and it will therefore be clear that as the head portions 34 move towards each other to embrace the latch member 26 that they will also move slightly towards the connecting link 30 which enables the keeper jaws 28 to not only embrace and retain the latch member 26 in position but also to draw the tailgate 20 toward the body 42 upon the actuation of the keeper jaws 28 into a closed position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A parting swivel joint for removably and swivelly securing a first element to an adjacent second element comprising a latch, said latch having a body portion and a neck portion having a reduced diameter, said neck portion terminating in a spherical latch member, means adapting said body for securement to said first element with said neck and latch member extending beyond a side thereof, an articulated keeper mechanism, said mechanism including a pair of keeper jaws having opposing head portions, means pivotally securing said jaws together for movement of said head portions toward and away from each other toward and from a closed position, said head portions having opposing semi-spherical recesses formed therein complementary to opposing sides of said latch member, means adapting said keeper mechanism for securement to said second element with said head portion extending beyond a side thereof, and means for positively moving said keeper jaws toward and away from each other with said recesses receiving and embracing opposite sides of said latch member.

2. The combination of claim 1 wherein said moving means simultaneously moves said head portions towards each other.

3. The combination of claim 1 wherein said head portions are apart a distance equal to the diameter of the neck of said latch when in the closed position wherein said elements may be pivoted with respect to each other about an axis extending through the center of said recesses and an axis extending longitudinally of said neck portion.

4. The combination of claim 1 wherein said keeper jaws are pivotally secured to each other intermediate their ends, said keeper jaws having inclined divergent opposing surfaces on their ends remote from said head portions forming a pocket therebetween, said moving means including an actuating lever having a projection thereon complementary to said pocket when said jaws are in the closed position, means adapting one end of said actuating lever to be pivotally secured to said second element with said projection movable through an arc to seat in said pocket, said moving means further including a pair of actuating links with one end of each pivotally secured to said projection and the other end of each secured to the end of one of said jaws remote from said head portions whereby the movement of said projection towards said pocket will pivot said jaws into engagement with said latch member.

5. The combination of claim 4 wherein said actuating links are of such a length to move to an overcenter position when said projection is seated within said pocket to yieldably retain said jaws in a closed position.

6. The combination of claim 1 wherein said moving means includes means for yieldably retaining said jaws in a closed position.

7. In combination with a truck having an open ended body, a generally rectangular tailgate for closing the open end of said body, said tailgate being secured to said body at each corner of said tailgate by a parting swivel joint, each parting swivel joint comprising a latch, said latch having a body portion and a neck portion having a reduced diameter, said neck portion terminating in a spherical latch member, said body being secured to said tailgate with said neck and latch member extending beyond the adjacent side edge of the tailgate, an articulated keeper mechanism, said keeper mechanism including a pair of keeper jaws having opposing head portions, means pivotally securing said jaws together for movement of said head portions toward and away from each other toward and away from a closed position, said head portions having opposing semi-spherical recesses formed therein complementary to opposite sides of said latch member, means securing said articulated keeper mechanism to a side of said truck body adjacent said latch with said head portions extending beyond the rear edge of the body sides, and means for positively moving said keeper jaws toward and away from each other with said recesses receiving and embracing opposite sides of said latch member.

8. The combination of claim 7 wherein said head portions are apart a distance equal to the diameter of the neck of said latch when in the closed position wherein said elements may be pivoted with respect to each other about an axis extending through the center of said recesses and an axis extending longitudinally of said neck portion.

9. The combination of claim 7 wherein said keeper jaws are pivotally secured to each other intermediate their ends, said keeper jaws having inclined divergent opposing surfaces on their ends remote from said head portions forming a pocket therebetween, said moving means including an actuating lever having a projection thereon complementary to said pocket when said lever jaws are in the closed position, means pivotally securing one end of said actuating lever to the side of said truck body with said projection being movable through an arc to seat in said pocket, said moving means further including a pair of actuating links with one end of each pivotally secured to said projection and the other end of each secured to the end of one of said jaws remote from said head portions whereby the movement of said projection towards said pocket will pivot said jaws into engagement with said latch member.

10. The combination of claim 9 wherein said actuating links are of such a length to move to an overcenter position when said projection is seated within said pocket.

References Cited in the file of this patent

UNITED STATES PATENTS

| 357,749 | Yale | Feb. 15, 1887 |
| 855,149 | Vaughn et al. | May 28, 1907 |
| 2,506,849 | Winterton | May 9, 1950 |
| 2,806,735 | Smith | Sept. 17, 1957 |